United States Patent [19]

Lambert et al.

[11] Patent Number: 5,043,133
[45] Date of Patent: Aug. 27, 1991

[54] AUTOMATED NUCLEAR FUEL ROD PATTERN LOADING SYSTEM

[75] Inventors: David V. Lambert, St. Matthews; Theodore W. Nylund, Columbia; John W. Byers, West Columbia; Damon E. Haley, Jr., Sumter; Joseph V. Cioffi, Cola, all of S.C.

[73] Assignee: Westinghouse Electric Corp., Pittsburgh, Pa.

[21] Appl. No.: 435,130

[22] Filed: Nov. 13, 1989

Related U.S. Application Data

[62] Division of Ser. No. 247,181, Sep. 21, 1988, Pat. No. 4,894,848.

[51] Int. Cl.⁵ .............................................. G21C 21/00
[52] U.S. Cl. ..................................................... 376/261
[58] Field of Search ............... 376/261, 260, 248, 258; 29/701, 723, 906; 414/146

[56] References Cited

U.S. PATENT DOCUMENTS

| | | | |
|---|---|---|---|
| 3,212,226 | 10/1965 | Murray et al. | 53/24 |
| 3,748,713 | 7/1973 | Tindale | 29/723 |
| 3,920,124 | 11/1975 | Patterson | 209/111.7 |
| 4,066,534 | 1/1978 | Arya | 209/82 |
| 4,292,788 | 10/1981 | King | 53/500 |
| 4,587,407 | 5/1986 | Ahmed et al. | 235/467 |
| 4,625,396 | 12/1986 | Ahmed et al. | 29/701 |
| 4,636,634 | 1/1987 | Harper et al. | 250/223 R |
| 4,649,632 | 3/1987 | Schoenig et al. | 376/463 |

FOREIGN PATENT DOCUMENTS

| | | |
|---|---|---|
| 2281635 | 3/1976 | France . |
| 2579359 | 9/1986 | France . |
| 57-93482 | 6/1982 | Japan . |
| 59-118319 | 7/1984 | Japan . |

Primary Examiner—Daniel D. Wasil

[57] ABSTRACT

Apparatus for loading fuel rods in a desired enirchment pattern includes a carrousel, an elongated fuel rod storage magazine, and a fuel rod verify and feed workstation and a magazine holder and indexing mechanism disposed between the carrousel and the magazine. The carrousel has a plurality of gondolas movable mounted thereon for stocking fuel rods of known enrichments. The magazine defines a matrix of elongated slots open at their forward ends for receiving fuel rods. The workstation defines a fuel rod feed path extending between the carrousel and the magazine and is adapted to receive successively one at a time along the feed path at its upstream end fuel rods from selected ones of the carrousel gondolas. The workstation includes an optical scanning and reading unit located along the feed path for verifying the identity of the fuel rods successively one at a time and a fuel rod feeding mechanism for successively feeding one at a time along the feed path the verified fuel rods into selected ones of the slots in the magazine. The magazine holder and indexing mechanism movably supports the magazine and is actuatable for moving the magazine along X-Y axes to successively align one at a time selected one of its slots with the feed path for loading in the magazine the successive fuel rods in a desired enrichment pattern.

4 Claims, 8 Drawing Sheets

AUTOMATED NUCLEAR FUEL ROD PATTERN LOADING SYSTEM

This is a division of application Ser. No. 07/247,181 filed Sept. 21, 1988, now U.S. Pat. No. 4,894,848.

BACKGROUND OF THE INVENTION

1. Field of the Invention

The present invention relates generally to nuclear fuel rod loading systems and, more particularly, is concerned with an automated system for loading fuel rods in a desired pattern into a magazine.

2. Description of the Prior Art

Fuel assemblies in nuclear reactors of the type utilized in power generation generally incorporate numerous fuel rods arranged in spaced-apart relationship within a skeleton including top and bottom nozzles or tie plates between which the fuel rods extend. Each fuel rod generally includes a metallic tube sealed at its opposite ends by end plugs and a stack of enriched nuclear fuel pellets contained within the tube between the end plugs. All of the fuel pellets within a given fuel rod are usually of the same enrichment, but fuel rods of the same or different enrichments can be used in a particular fuel assembly depending upon the reactor type. For example, a pressurized water reactor (PWR) typically utilizes fuel assemblies with fuel rods of the same enrichment in a particular fuel assembly, whereas a boiling water reactor (BWR) utilizes fuel assemblies of multiple enrichments which require the fuel rods to be arranged in a particular pattern.

It will be appreciated that fuel rod loading systems must accommodate procedures for properly identifying fuel rods of particular enrichments and for tracking them in carrying out loading of the fuel rods into the desired patterns in which they will reside in fuel assemblies. Representative prior art fuel rod loading systems are disclosed in patents to Ahmed et al (U.S. Pat. No. 4,625,396), Schoenig, Jr. et al (U.S. Pat. No. 4,649,632) and Vere et al (French Pat. No. 2,579,359).

In the fuel rod loading system disclosed by the above-cited Ahmed et al patent, which is assigned to the same assignee as the present invention, individual fuel rods have applied thereto a bar code label for identifying the enrichment of the fuel rod. An optical reader is employed by an operator for reading the identifying data on the fuel rod label. The optical reader inputs the data to a computer which compares the data with stored data for the particular fuel rod pattern of the fuel assembly to be loaded to match the fuel rod with the correct location.

Thus, to load fuel rods in the desired pattern for a BWR fuel assembly, an operator takes an individual fuel rod from a supply thereof and manually deploys the optical scanner to read and input the identifying data. The computer then displays on its screen the proper location for the fuel rod in the BWR fuel assembly. The operator then inserts the fuel rod into the location in a loading magazine which corresponds to the proper BWR fuel assembly location. The steps are repeated to complete the BWR pattern of loaded fuel rods.

The above-summarized loading system of the Ahmed et al patent is a step in the right direction toward automating the loading of fuel rods. However, the procedures required to be performed by the operator are tedious and susceptible to operator error. Consequently, a need still exists for steps toward further automation of the loading system that will reduce or eliminate entirely the opportunity for operator error.

SUMMARY OF THE INVENTION

The present invention provides an automated fuel rod pattern loading system designed to satisfy the aforementioned needs. The automated loading system of the present invention employs method and apparatus for loading fuel rods into a fuel rod magazine in a particular pattern with minimum of operator assistance. No operator judgment is required to assure a correct loading pattern. Although the automated loading system is particularly suited for loading BWR fuel rods which may differ in enrichment, it could be used for other types of fuel rods as well.

Accordingly, the present invention is directed to an apparatus for loading fuel rods in a desired pattern which comprises (a) means in the form of a carrousel having a plurality of movable gondolas for stocking thereon fuel rods of known enrichments; (b) an elongated magazine defining a matrix of elongated slots open at their forward ends for receiving fuel rods; (c) a workstation defining a fuel rod feed path and including means for receiving successively one at a time along feed path fuel rods from selected ones of the carrousel gondolas and verifying the identity of the fuel rods and means for feeding successively one at a time along the feed path the verified fuel rods into selected ones of the slots in the magazine; and (d) an holder and indexing mechanism for movably supporting the magazine and being actuatable for moving the magazine along X-Y axes to successively align one at a time selected ones of its slots with the feed path for loading in the magazine the successive fuel rods in a desired enrichment pattern.

Also, the present invention is directed to a method for loading fuel rods in a desired pattern, comprising the steps of: (a) stocking a carrousel with a supply of fuel rods of known enrichments; (b) providing a magazine defining a matrix of elongated slots open at their forward ends for receiving fuel rods; (c) defining a fuel rod feed path; (d) receiving successively one at a time along the feed path fuel rods selected from the supply thereof; (e) verifying successively one at a time along the feed path the identity of the selected fuel rods; (f) feeding to the magazine successively one at a time along the feed path the selected and verified fuel rods; and (g) supporting and moving the magazine along X-Y axes to successively align one at a time selected ones of said slots with the feed path for loading in the magazine the successive fuel rods in a desired enrichment pattern.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 1:
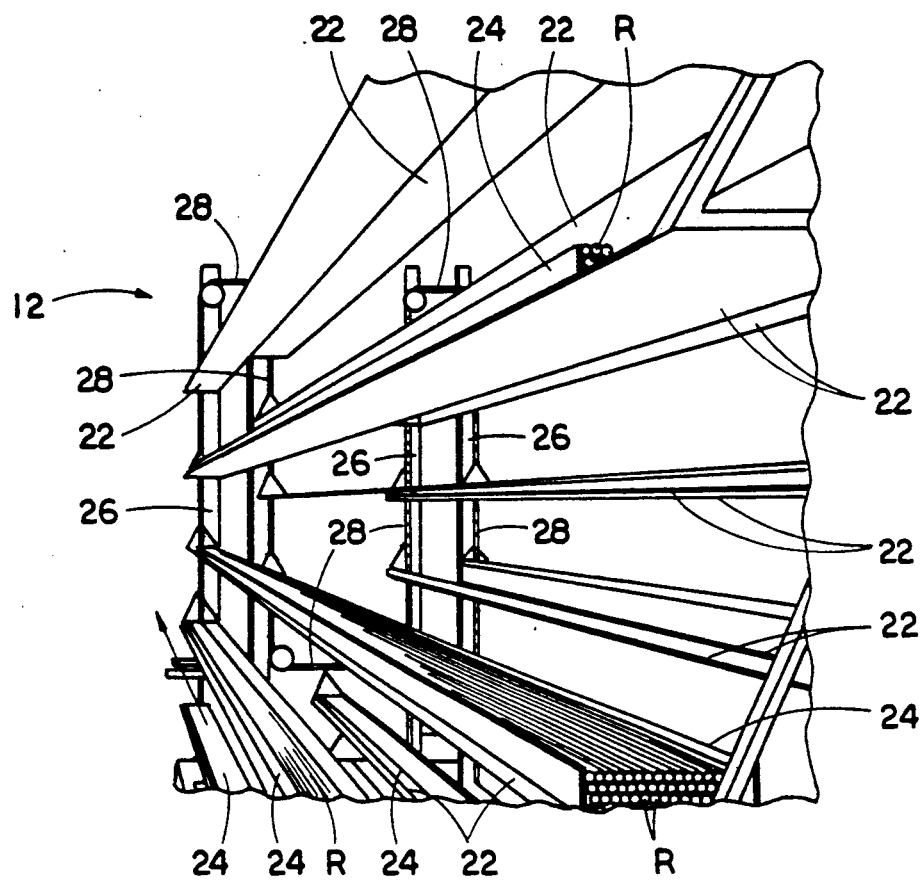
FIG. 1 is a fragmentary perspective schematic view of a carrousel employed in the fuel rod loading apparatus of the present invention.
Figure 2:
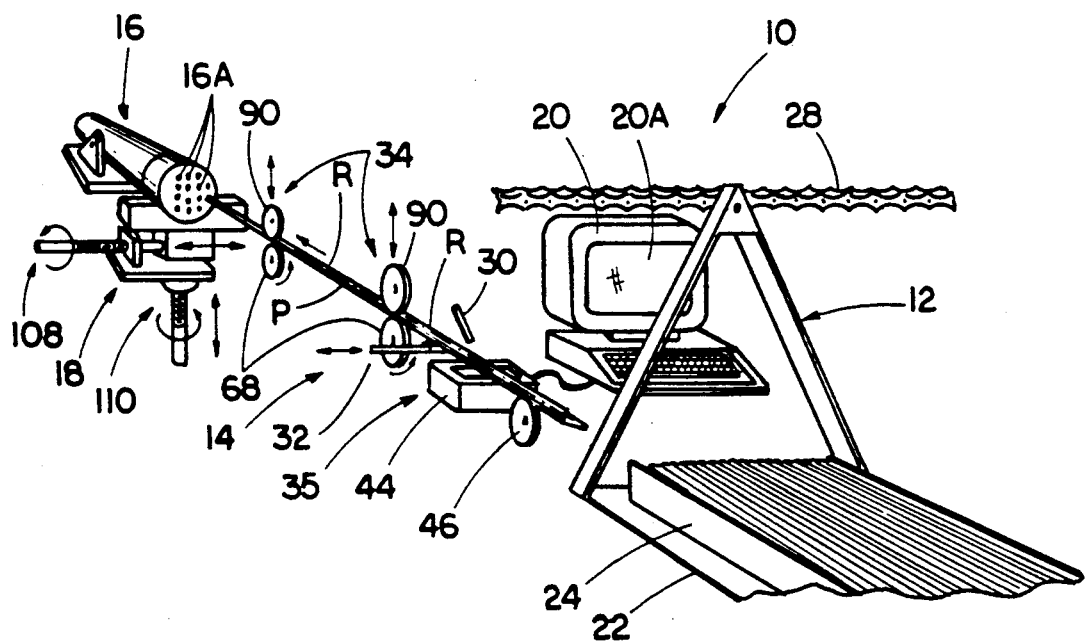
FIG. 2 is a schematic view of components of the fuel rod loading apparatus associated with the carrousel and located approximately at the encircled region of FIG. 1.
Figure 3:
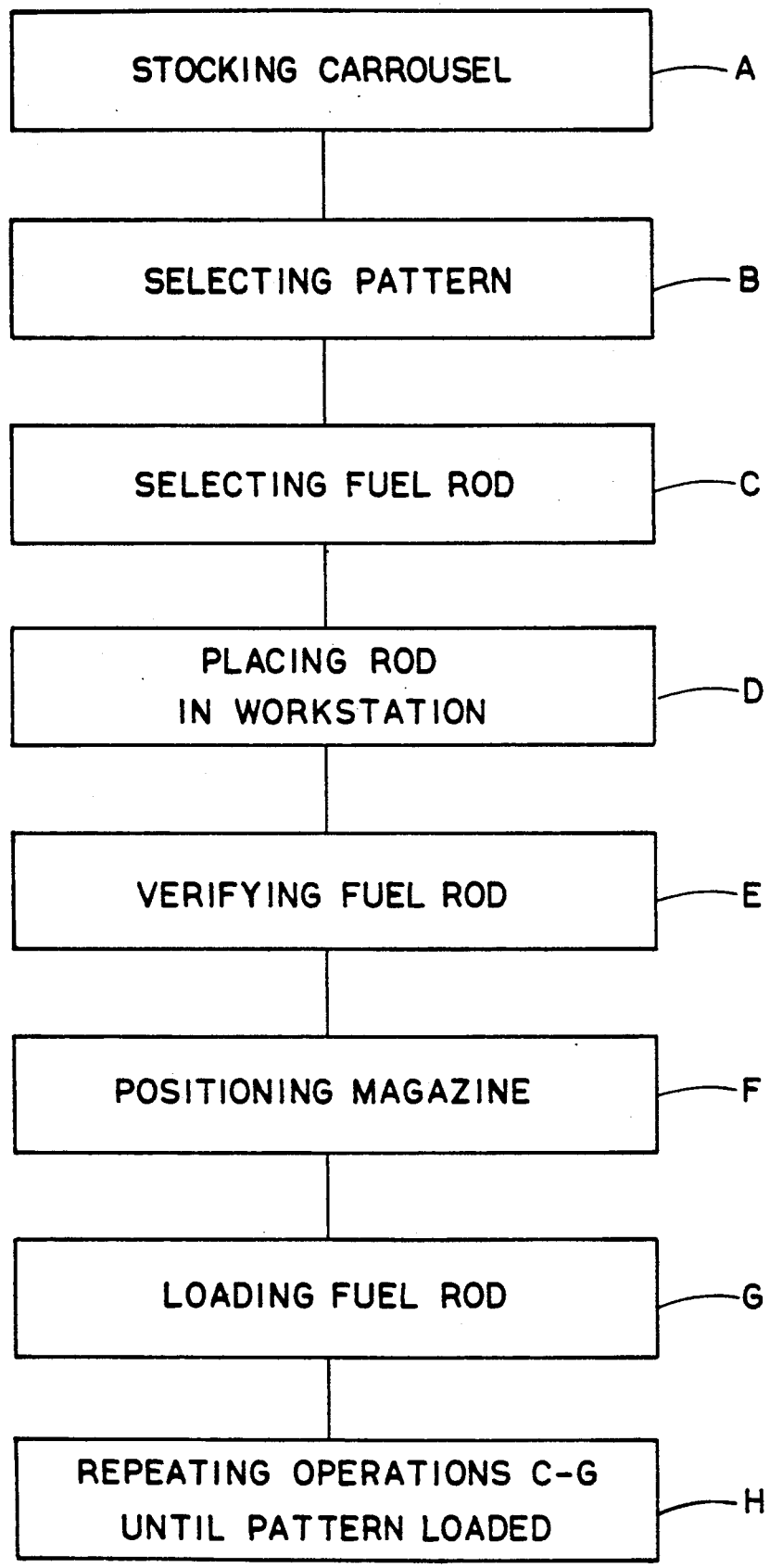
FIG. 3 is a flow chart depicting the overall sequence of operations performed in the fuel rod pattern loading system.

Referring now to the drawings, and particularly to FIGS. 1 and 2, there is shown schematically the components of a fuel rod loading apparatus, generally designated 10, of the present invention employed by the fuel rod pattern loading system for carrying out the operations thereof depicted in flow chart form in FIG. 3. In its basic components, the fuel rod loading apparatus 10 includes a fuel rod supply carrousel 12, a fuel rod verify and transfer workstation 14, a fuel rod pattern storage magazine 16, and a magazine holder and indexing mechanism 18. The fuel rod pattern loading system employs a stand alone computer 20 which integrates, coordinates and controls the various operations performed by these components of the apparatus 10.

Overall Fuel Rod Pattern Loading System

As depicted in the flow diagram of FIG. 3, block A denotes the initial operation in the fuel rod pattern loading system of stocking the storage or supply carrousel 12 with fuel rods R (FIGS. 1 and 2). The carrousel 12 is composed of a plurality of gondolas 22 which receive and support storage channels or trays 24 containing multiplicities of fuel rods R some of which with identical enrichments and others with different enrichments. Preferably, any given tray 24 contains fuel rods R having the same enrichment so that fuel rod selection will only need to be made between fuel rods of different trays and not between fuel rods within a single tray itself. The carrousel 12 also has a framework 26 movably supporting at its opposite ends a pair of endless chains 28 (only one being shown) between which the gondolas 22 extend and to which the opposite ends of the gondolas 22 are attached.

The operator at the system computer 20 selects and initiates a menu option of the software to load or stock the carrousel 12 and is prompted on the computer screen 20A to scan the fuel rod trays 24 with a bar code reader 30 to identify its contents. When this is done, the data identifying the tray 24 is transmitted to the database in the memory of the system computer 20. The operator is then prompted on the screen 20A to place the identified tray 24 onto one gondola 22 of the carrousel 12 and to scan the gondola bar code to identify on which one of the gondolas 22 the tray 24 is being placed. This sequence is repeated until the carrousel 12 is completely stocked. Thus, the system computer 20 is now provided with a database of the type of fuel rods R located in each tray 24 and where on the gondolas 22 of the carrousel 12 each particular tray is located.

Block B in FIG. 3 denotes the next operation of the fuel rod pattern loading system of selecting the mini-bundle pattern which begins actual loading of a particular mini-bundle pattern of fuel rods R into the storage magazine 16. Once the pattern has been selected, the computer 20 will prompt the operator on the screen 20A to take certain actions and will control the operations of the verify and transfer workstation 14 and of the indexing mechanism 18 in a sequence or cycle which will be repeated a number of times, for instance sixteen times for loading a 4×4 BWR mini-bundle, to accomplish substantially automatic loading of fuel rods in the storage magazine 16 based on a design matrix already entered in the database of the system computer 20.

Again, the operator at the system computer 20 selects and initiates a menu option of the software to initiate loading of the magazine by selecting the mini-bundle pattern. The computer screen 20A prompts the operator to move a mini-bundle storage magazine 16 into place. Next, the operator reads and keys in the pattern identification number engraved on a BWR fuel assembly top tie plate and then attaches this plate to the magazine holder 32. This keyed-in number identifies to the computer what type of mini-bundle pattern is to be loaded into the magazine 16. The computer 20 in its database then runs a check of the carrousel inventory to verify that the correct quantity and mix of fuel rods R exist on the carrousel 12 for that type of mini-bundle pattern.

Blocks C and D in FIG. 3 denote the first two operations in a sequence of the fuel rod pattern loading system which is repeated until loading of the selected mini-bundle pattern is completed. These first two operations involve, first, the computer 20 selecting the first appropriate gondola 22 of the carrousel 12 having the desired initial type of fuel rod R to be loaded in the selected mini-bundle pattern and, second, the operator actually manually taking a fuel rod by its leading end from the tray 24 on the selected gondola 22 and placing the rod end into the verify and transfer workstation 14. The system computer 20 is interfaced with the carrousel 12 so as to operate the same to cause movement of the gondolas 22 so as to bring the first appropriate one of the gondolas into general alignment with the workstation 14 as seen in FIG. 2. The screen 20A of the system computer 20 then prompts the operator to place one of the fuel rods from the selected gondola into the workstation 14.

Block E in FIG. 3 denotes the next operation of the repeated loading sequence of the fuel rod pattern loading system. The operation involves verifying that the correct fuel rod has been placed in the workstation 14 by the operator. Basically, the workstation 14 includes a stop gate mechanism 32 near its upstream end and a fuel rod feed mechanism 34 near its downstream end. The stop gate mechanism 32 is initially positioned to block and prevent movement of the fuel rod R downstream by the operator to the feed mechanism 34 until it is verified by the computer 20 as being of the correct type of enrichment.

To verify the fuel rod R, the operator manually uses the bar code reader 30 to read and input the rod bar code label. The computer 20 then verifies a correct rod identification number and associates the number to the enrichment of the rod. From this data and that of the selected mini-bundle pattern, the computer 20 will control the indexing mechanism 18 to move the magazine 16 to the correct position for insertion of the rod into the proper slot in the magazine 16.

Block F in FIG. 3 denotes the another operation of the repeated loading sequence of the fuel rod pattern loading system wherein the magazine 16 is properly positioned so that the correct magazine slot in which to insert the fuel rod is aligned with the feed mechanism 34 on the workstation 14. The computer 20 controls operation of the magazine holder and indexing mechanism 18 to move the magazine with respect to X-Y axes until the appropriate slot in the magazine is aligned with the rod. After the fuel rod's bar code has been read and verified and after the magazine has been indexed into the correct position, the mechanical stop gate mechanism 32 is activated to move and unblock the path P of the fuel rod R through the workstation 14 so that the rod can then be manually move into engagement with the fuel rod feed mechanism 34.

Block G in FIG. 3 denotes the final operation of the fuel rod pattern loading system in its repeated loading sequence. In this operation, the verified fuel rod is driven or loaded into the proper magazine slot by operation of the feed mechanism 34. Block H in FIG. 3 denotes that the operations of blocks C to G are repeated until loading in the magazine 16 of the selected mini-bundle pattern of fuel rods is completed. In the repetition of the sequence, the positioning of the magazine 16 can take place concurrently as the appropriate gondola 22 is being located and moved into alignment with the workstation 14.

Upon completion, the system computer 20 creates a mini-bundle identification number by combining the tie plate engraved number with the identification numbers of the sixteen fuel rods. A workstation printer (not shown) then prints a color coded routing card for the magazine which includes the fuel rod identification numbers, enrichments, and actual magazine loading pattern.

Fuel Rod Loading Apparatus

In addition to the fuel rod supply carrousel 12 which was described in detail above, as schematically depicted in FIG. 2 the fuel rod loading apparatus 10 also includes the above-mentioned fuel rod verify and transfer workstation 14, the fuel rod pattern storage magazine 16, and the magazine holder and indexing mechanism 18. The gondolas 22 of the carrousel 12 stock fuel rods R of known enrichments in trays 24 and are movably mounted to bring a selected tray 24 of rods into general alignment with the workstation 14. The magazine 16 defines a matrix of elongated slots 16A open at their forward ends for receiving fuel rods R. The workstation 14 defines the fuel rod feed path P extending between the carrousel 12 and the magazine 16 and is adapted to receive successively one at a time along the feed path P, at its upstream end, fuel rods R from selected ones of the carrousel gondolas 22. The workstation 14 includes an optical scanning and reading unit 35 located along the feed path P for verifying the identity of the fuel rods R successively one at a time. The workstation 14 also includes the fuel rod feed mechanism 34 for successively feeding one at a time along the feed path P the verified fuel rods into selected ones of the slots 16A in the magazine 16. The magazine holder and indexing mechanism 18 movably supports the magazine 16 and is actuatable for moving the magazine 16 in a generally vertical plane along X-Y axes to successively align one at a time selected ones of its slots 16A with the feed path P for loading in the magazine 16 the successive fuel rods R in a desired enrichment pattern.

Referring now to FIGS. 4–8, the fuel rod verify and transfer workstation 14 of the loading apparatus 10 is illustrated in greater detail. The workstation 14 includes a frame 36 constructed of a plurality of vertical legs 38 supporting a top horizontal platform 40 and reinforced by a plurality of cross members 42 which extend between and interconnect the legs 38. Mounted to the frame platform 40 in alignment along the fuel rod path P and arranged from the upstream to downstream ends of the platform 40 are an optical scanner 44 of the unit 35 with which the bar code reader 30 of the unit 35 is used, a pair of guide idler rollers 46,48 rotatably mounted on by respective supports 46A,48A at upstream and downstream sides of the scanner 44, the stop gate mechanism 32 disposed between the scanner 44 and the downstream guide roller 48, the rod feed mechanism 34, and a stationary rod guide 50 and rod sensor 52 disposed between the guide roller 48 and the upstream entry end of the feed mechanism 34 for turning "on" the feed mechanism 34 in response to sensing the presence of a fuel rod.

Figure 6:
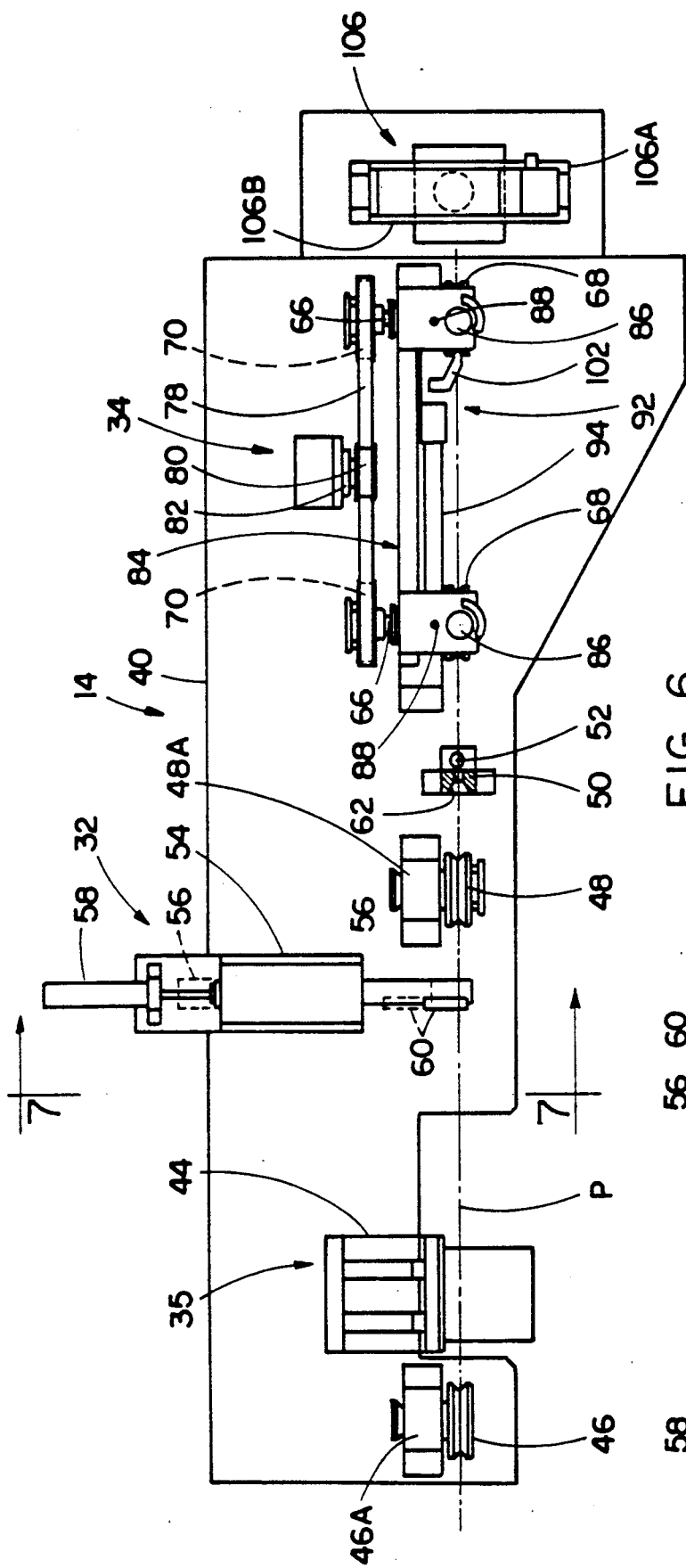
FIG. 6 is a top plan view of the workstation as seen along line 6—6 of FIG. 4.
Figure 7:
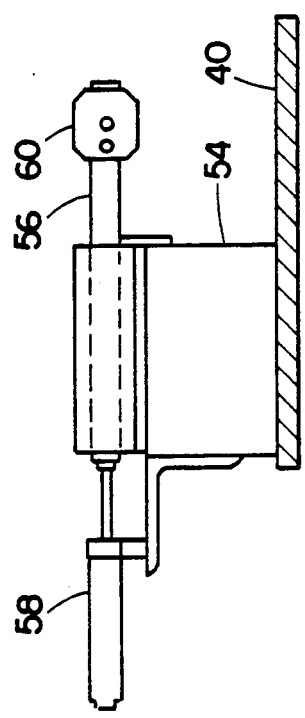
FIG. 7 is an enlarged end elevational view of a stop gate mechanism of the workstation as seen along line 7—7 of FIG. 6.

In FIGS. 6 and 7, the arrangement and construction of the stop gate mechanism 32 of the workstation 14 is illustrated in detail. The stop gate mechanism 32 is disposed along the feed path P between the scanning and reading unit 35 (which includes the bar code reader 30 and the optical scanner 44) used to verify the identity of the fuel rods R and the fuel rod feed mechanism 34 of the workstation 14. In particular, the stop gate mechanism 32 is located immediately upstream of the downstream guide idler roller 48 and is operable relative to the feed path P between a blocking position shown in solid line in FIG. 6 and an unblocking position shown in dashed line in FIG. 6 for respectively preventing and allowing passage of a fuel rod R.

The stop gate mechanism 32 includes a bracket 54 attached on the platform 40 of the frame 36 and mounting an arm 56 for reciprocatory sliding movement toward and away from the feed path P, an actuator 58 in the form of an air cylinder mounted to the bracket 54 and connected to one end of the slide arm 56. The actuator 58 is operable for moving the slide arm 56 between extended and retracted positions shown respectively in solid and dashed line forms in FIG. 6. A gate 60 in the form of a flat plate mounted to an opposite end of the slide arm 56 is disposed across the feed path P when the arm 56 is at its extended position and is withdrawn away from the feed path P when the arm 56 is at its retracted position. Operation of the actuator 58 is controlled by the system computer 20. The actuator 58 is actuated to retract the arm 56 and gate 60 upon verification of the identity of the fuel rod whose leading end is currently placed across the scanning and reading unit 35.

In FIGS. 4–6 and 8, the arrangement and construction of the fuel rod feed mechanism 34 of the workstation 14 is illustrated in detail. The feed mechanism 34 is located downstream of the stationary rod guide 50 and rod sensor 52 which, in turn, are disposed downstream of the one guide roller 48. When the feed path P is unblocked by the stop gate mechanism 32, the leading end of the fuel rod R is manually slid or moved by the operator onto the guide roller 48, then through the tapered hole 62 in the rod guide 50 and past the rod sensor 52 into the entry end of the feed mechanism 34. The computer 20 receives a signal from the rod sensor 52 and activates operation of the feed mechanism 34 in response to sensing the arrival of the fuel rod.

The feed mechanism 34 includes a pair of housings 64 mounted to the frame platform 40 in spaced apart relation and having respective shafts 66 rotatably journaled within and extending horizontally through the housings 64. Along one side of the housings 64, respective drive rollers 68 are attached to the protruding ends of the shafts so as to be spaced apart along the feed path P. Along the other side of the housings 64, respective driven pulleys 70 are attached to the opposite protruding ends of the shafts 66. The mechanism 34 also includes a motor 72 attached to the underside of the platform 40 between and below the housings 64. The motor 72 has a rotary output drive shaft 74 with a drive pulley 76 fixed thereon. A drive belt 78 is entrained about the drive pulley 76 and driven pulleys 70. An idler pulley 80 for adjusting tension in the belt 78 is rotatably mounted by a bracket 82 mounted to the platform 40 between the driven pulleys 70. Thus, it will be understood that the drive rollers 68 are rotated by operation of the motor 72 via their mounting on the same rotatable shafts as the driven pulleys 70.

The feed mechanism 34 also includes a superstructure 84 mounted above and bridging between the housings 64 and respective actuators 86 in the form of air cylinders supported on the superstructure 84. The piston rod ends 86A of the actuators 86 support guide rods 88 and rotatably mount pressure rollers 90 such that the pressure rollers 90 are located directly above and aligned with the respective drive rollers 68. Upon operation of the feed mechanism 34, the actuators 86 extend from their retracted conditions seen in FIGS. 4, 5 and 8, and move the pressure rollers 90 toward the lower drive rollers 68 for engaging and pinching a fuel rod R therebetween and cause feeding of the rod along the feed path P toward the magazine 16. The sensor 52 causes operation of the actuators 86 upon sensing the arrival of the fuel rod at the entry end of the feed mechanism 34.

Figure 4:
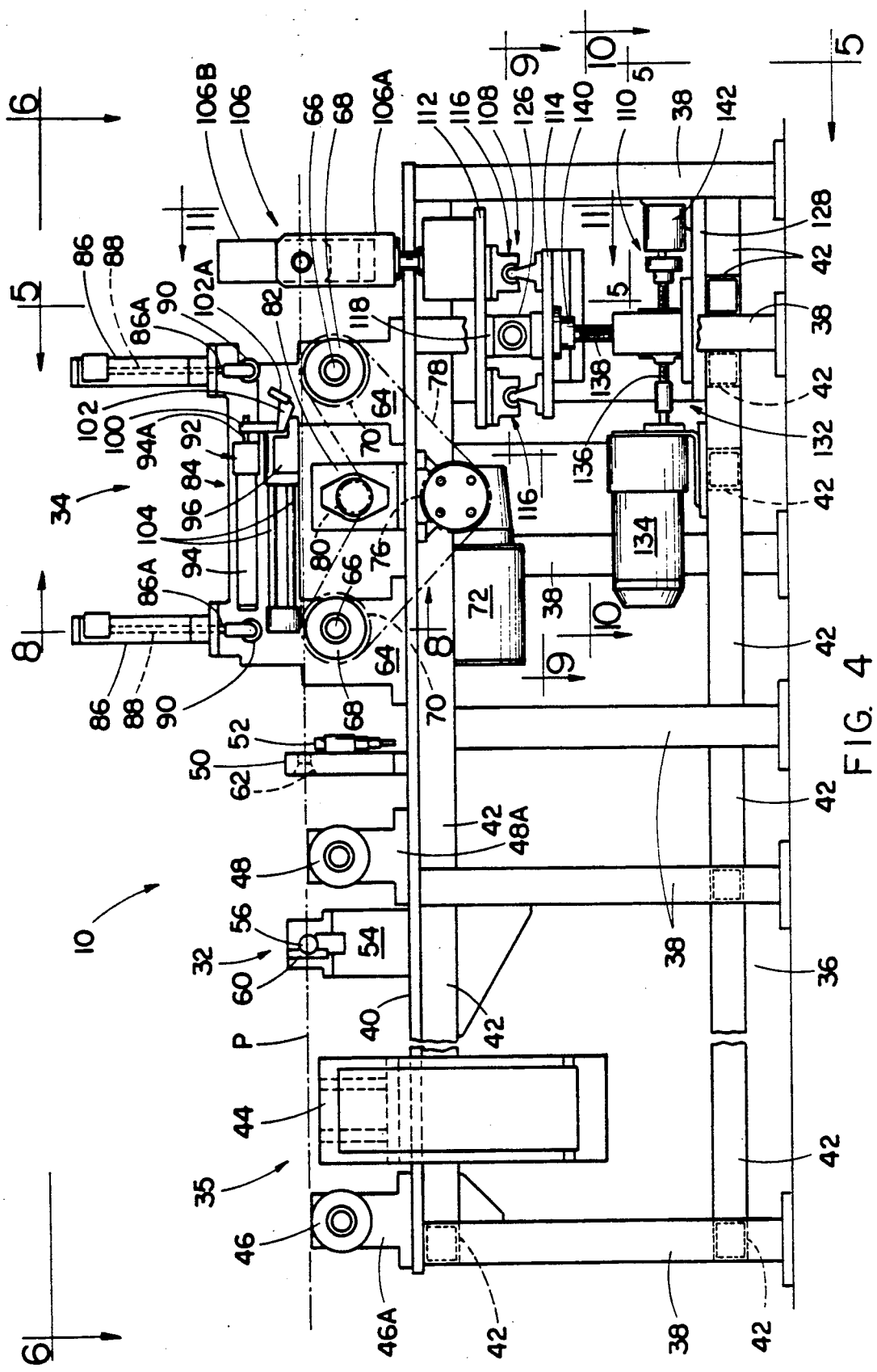
FIG. 4 is a side elevational view of a fuel rod verify and transfer workstation of the fuel rod loading apparatus of the present invention.
Figure 5:
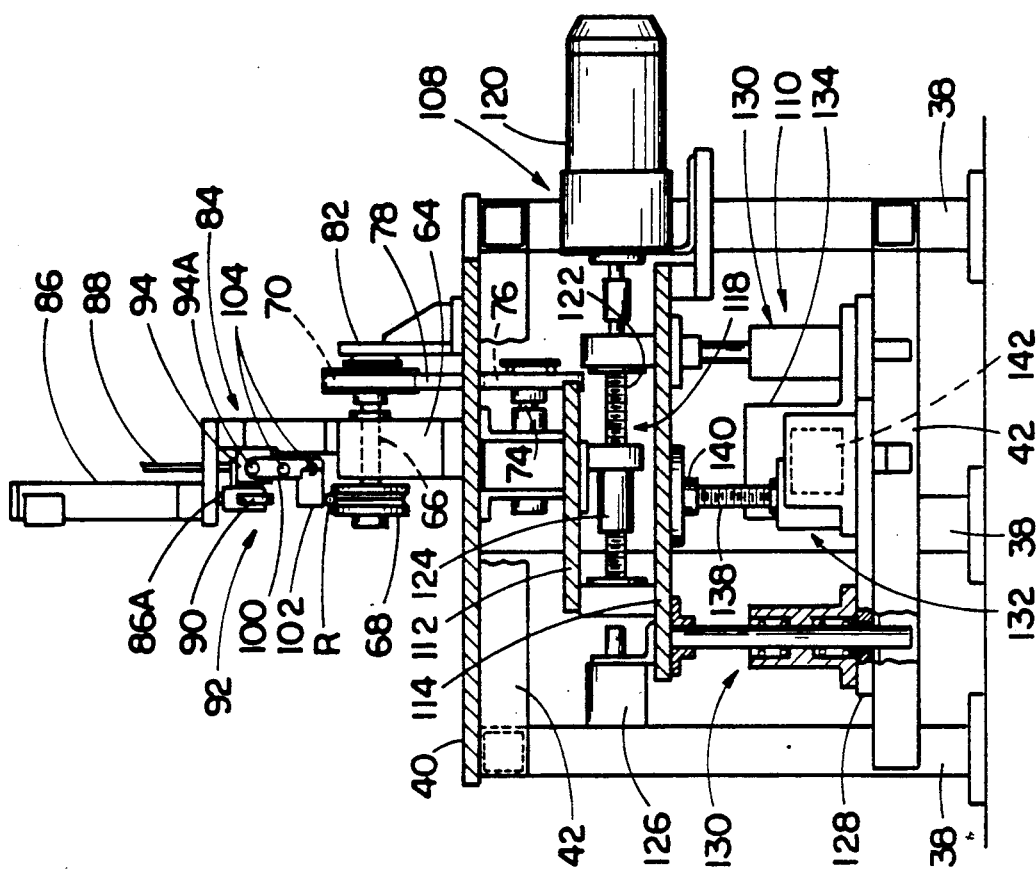
FIG. 5 is an end elevational view of the workstation as seen along line 5—5 of FIG. 4.
Figure 8:
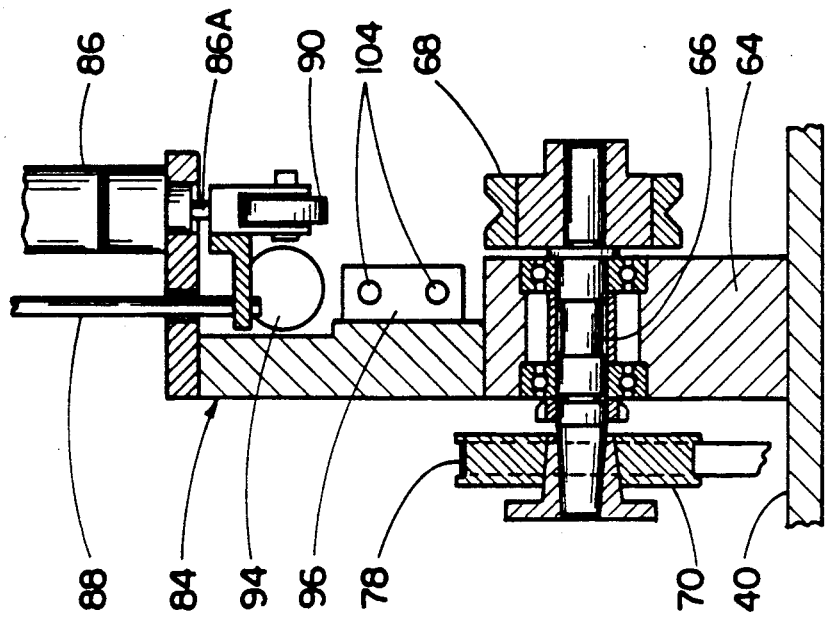
FIG. 8 is an enlarged vertical sectional view of a fuel rod feed mechanism of the workstation taken along line 8—8 of FIG. 4.

In FIGS. 4, 5 and 8, the arrangement and construction of a fuel rod feed assist mechanism 92 of the workstation 14 is also illustrated. The feed assist mechanism 92 is used in conjunction with the fuel rod feed mechanism 34 to ensure that the individual fuel rods R are inserted completely in the magazine 16. The feed assist mechanism 92 includes an actuator 94 in the form of an air cylinder mounted horizontally to the superstructure 84 between the pressure rollers 90 and above and offset from the feed path P. Also, the feed assist mechanism 92 includes a guide structure 96 mounted to the superstructure 84 parallel to and below the actuator 94, a cam member 98 mounted to the guide structure 96 adjacent its downstream end, and a device composed of a connector 100 and a finger 102 pivotally mounted to one side of the connector 100. The connector 100 is attached at its upper end to the piston rod end 94A of the actuator 94 and at its middle and lower end to a pair of horizontally movable telescopible members 104 of the guide structure 96.

Once the drive rollers 68 and pressure rollers 90 of the feed mechanism 34 have driven a fuel rod most of the way into the magazine 16 and as far downstream as they can, the feed assist mechanism 92 takes over and is operated to continue driving of the fuel rod completely into the magazine. Specifically, its actuator 94 is extended from the retracted position shown in FIG. 4 and toward a hoop-shaped bracket 106 of the magazine holder and indexing mechanism 18. As the actuator piston rod end 94A extends, it carries the connector 100 with it which moves the pivotal finger 102 off the cam element 98 allowing the finger to pivot by gravity clockwise and downwardly into the feed path P upstream of the trailing end of a fuel rod. Continued extension of the actuator 94 brings an end 102A of the finger into contact with the trailing end of the fuel rod to impart sufficient driving motion thereto to fully insert the fuel rod in the magazine 16. Retraction of the actuator 94 will return the finger 102 to its position seen in FIG. 4 in which it is pivoted counterclockwise out of the feed path P.

Turning now to FIGS. 4, 5, and 9–11, there is illustrated in detail the arrangement and construction of the magazine holder and indexing mechanism 18 of the fuel rod loading apparatus 10. The indexing mechanism 18 is located downstream of and adjacent to the exit end of the feed mechanism 34 and at the front end of the magazine 16. The indexing mechanism 18 basically includes the above-mentioned hoop-shaped bracket 106, upper indexing means 108 for moving the bracket 106 and magazine 16 in the horizontal X direction, and lower indexing means 110 for moving the upper indexing means 108, bracket 106 and magazine 16 in the vertical Y direction.

Figure 11:
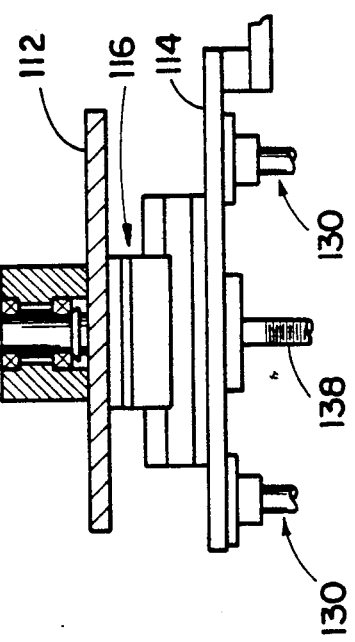
FIG. 11 is an enlarged end elevational view of the magazine holder of the workstation as seen along line 11—11 of FIG. 4.
Figure 15:
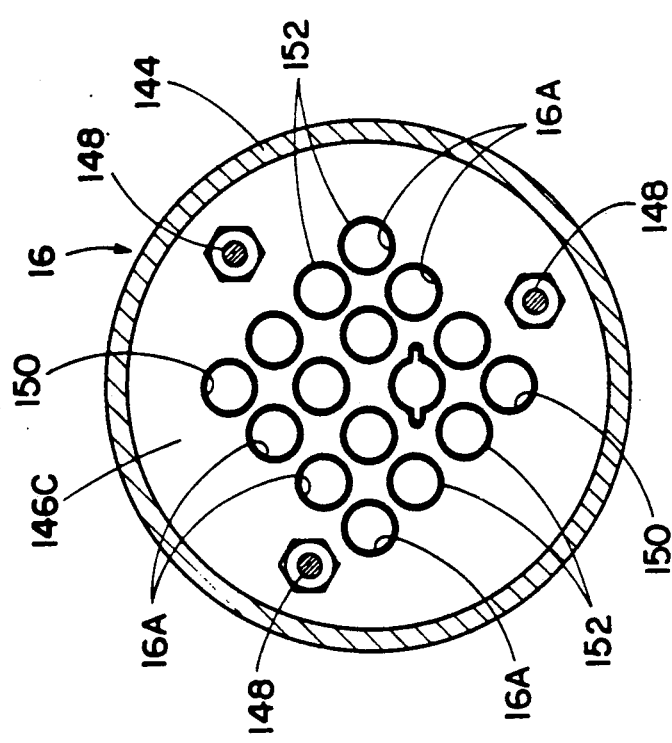
FIG. 15 is an enlarged cross-sectional view of the magazine taken along line 15—15 of FIG. 12.

As best seen in FIG. 11, the bracket 106 of the indexing mechanism 18 includes a generally U-shaped portion 106A rotatably mounted about a vertical axis to an upper horizontal plate 112 and a circular portion 106B pivotally mounted about a horizontal axis to the U-shaped portion 106. The circular bracket portion 106B receives and attaches to the front end portion of the magazine 16 for supporting the same. Movement of the brackets portions 106A,106B about the respective orthogonal horizontal X and vertical Y axes results when the upper plate 112 mounting the bracket 106 is correspondingly moved vertically and horizontally.

Figure 9:
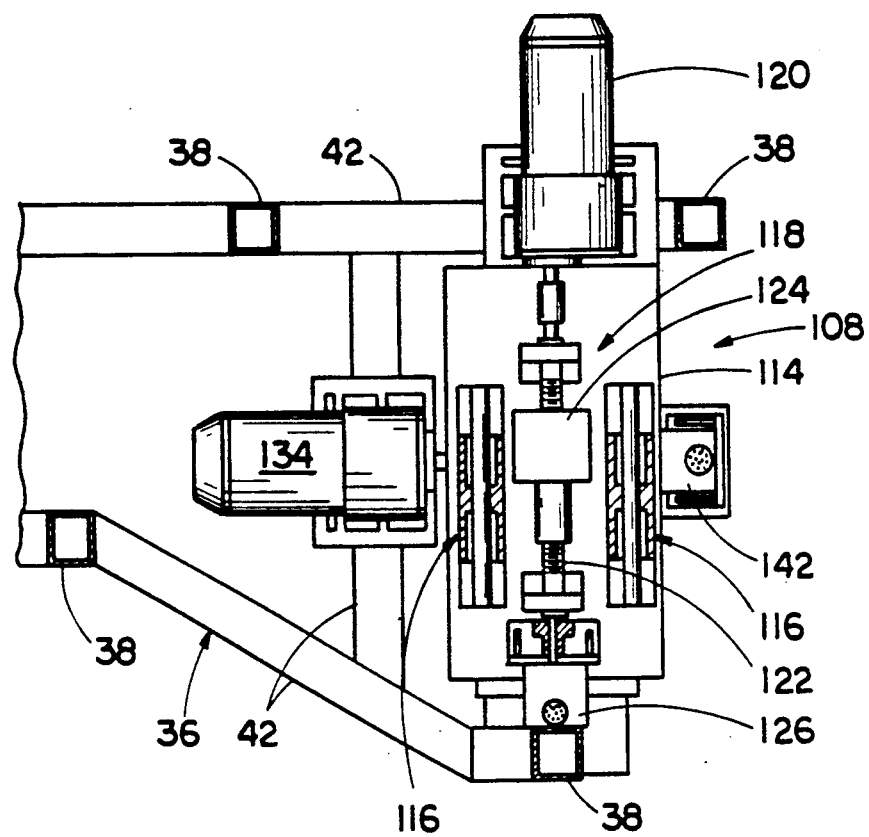
FIG. 9 is a top plan view of the horizontal direction indexing components of a magazine holder and indexing mechanism of the workstation as seen along line 9—9 of FIG. 4.

As best seen in FIGS. 4 and 9, the upper indexing means 108 of the indexing mechanism 18 includes the upper plate 112 which mounts the hoop-shaped bracket 106, a lower horizontal plate 114 which underlies and is spaced below the upper plate 112, a pair of spaced apart horizontal guide members 116 and a first actuator 118.

The guide members 116 are mounted upon the lower plate 114 along opposite sides of the first actuator 118. The guide members 116, in turn, support and guide movement of upper plate 112 along the horizontal X axis relative to the lower plate 114. The first actuator 118 includes a motor 120 mounted on an extension 114A of the lower plate 114 and an elongated externally threaded screw shaft 122 attached to and rotatably driven by the motor 120. The screw shaft 122, in turn, is coupled to an internally threaded housing 124 fixed to the underside of the upper plate 112. In such manner, the first actuator 118 is mounted to the lower plate 114 and driving coupled to the upper plate 112 and operable to cause movement of the upper plate 112 along the path of the horizontal guide members 116 relative to lower plate 114 and along the horizontal X axis. A motion transducer device 126 is provided adjacent at end of the screw shaft 122 opposite the motor 120 for providing feedback of the position of the shaft to the computer 20 for control purposes.

Figure 10:
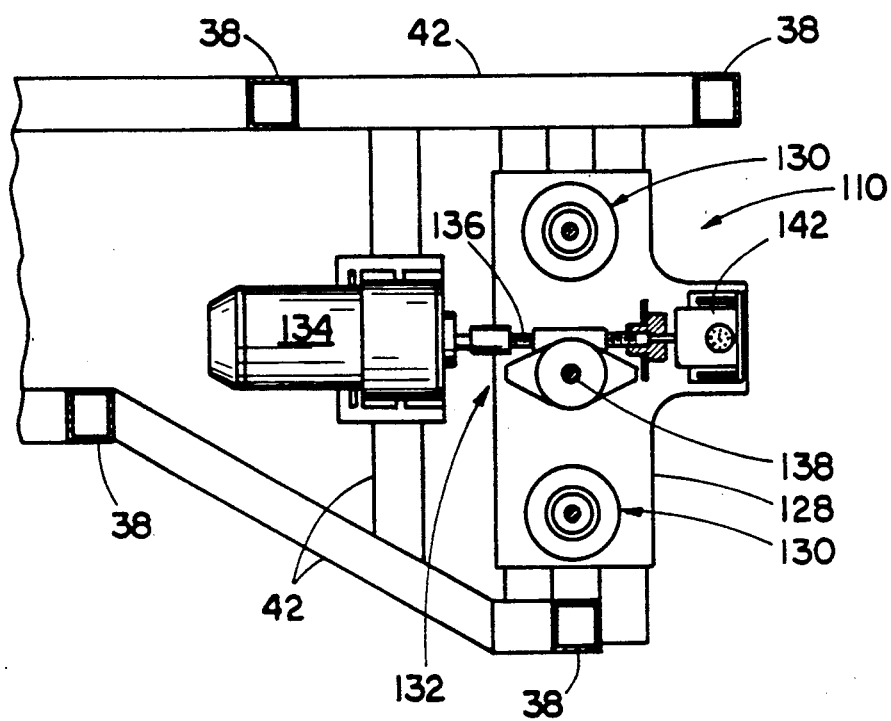
FIG. 10 is a top plan view of the vertical direction indexing components of the magazine holder and indexing mechanism of the workstation as seen along line 10—10 of FIG. 4.
Figure 12:
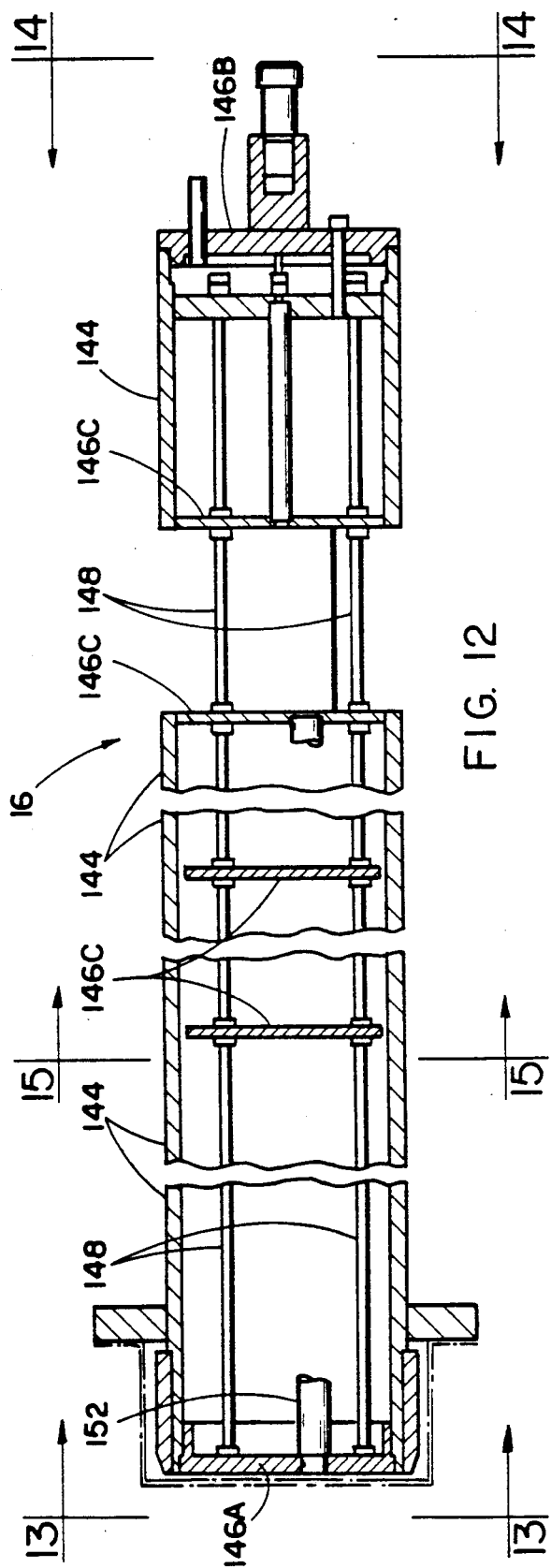
FIG. 12 is an enlarged foreshortened axial sectional view of a fuel rod pattern storage magazine employed in the fuel rod loading apparatus of the present invention.
Figure 14:
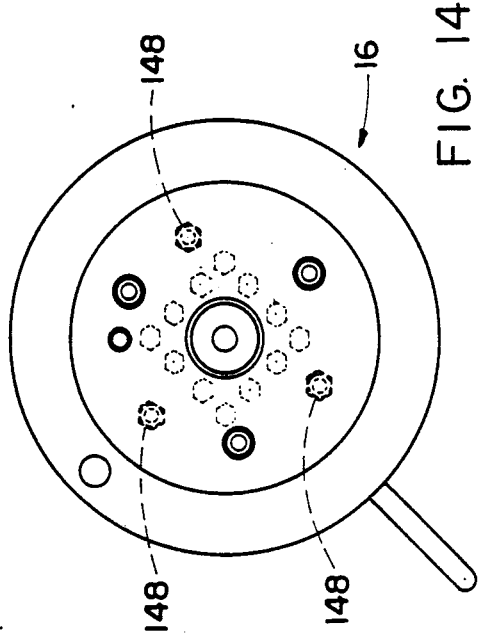
FIG. 14 is a is a rear end elevational view of the magazine as seen along line 14—14 of FIG. 12.
Figure 13:
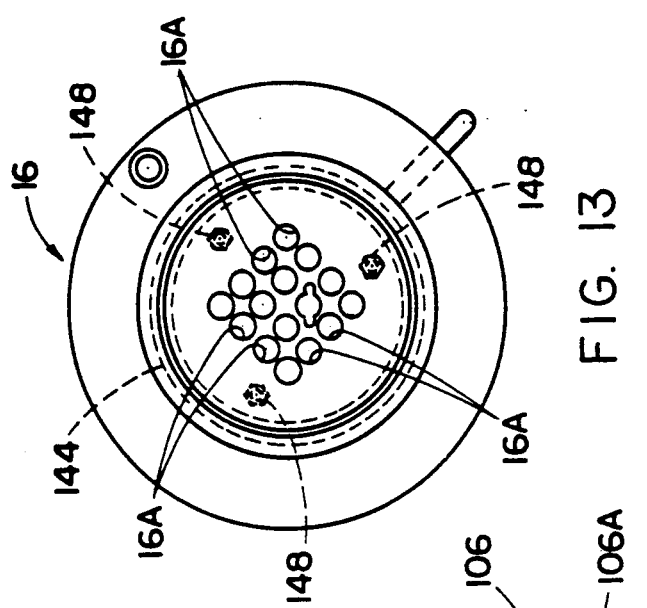
FIG. 13 is a front end elevational view of the magazine as seen along line 13—13 of FIG. 12.

As best seen in FIGS. 4 and 10, the lower indexing means 110 of the indexing mechanism 18 includes a horizontal platform 128 which underlies and is spaced below the lower plate 114 of the upper indexing means 110, a pair of spaced apart vertical guide members 130 and a second actuator 132. The guide members 130 are mounted upon the horizontal platform 128 along opposite sides of the second actuator 132. The guide members 130, in turn, support and guide movement of the lower plate 114 of the upper indexing means 108 (and therewith all of the rest of the components thereof) along the vertical Y axis relative to the platform 128. The second actuator 132 includes a motor 134 mounted on one of the frame cross members 42 adjacent the platform 128 and a pair of intermeshing externally-threaded horizontal and vertical screw shafts 136,138, with the horizontal screw shaft 136 being attached to and rotatably driven by the motor 134 and the vertical screw shaft 138, in turn, being coupled to an internally threaded housing 140 fixed to the underside of the lower plate 114. In such manner, the second actuator 132 is mounted to the horizontal platform 128 and driving coupled to the lower plate 114 and operable to cause movement of the lower plate 114 along the path of the vertical guide members 130 relative to platform 128 and along the vertical Y axis. Another motion transducer device 142 is provided adjacent at end of the horizontal screw shaft 136 opposite the motor 134 for providing feedback of the position of the shaft to the computer 20 for control purposes.

In FIGS. 12-15, the construction of the fuel rod pattern storage magazine 16 is illustrated in detail. The magazine 16 includes a generally cylindrical shell 144 with circular opposite end plates 146A,146B and spaced intermediate plates 146C being interconnected by longitudinally extending tie rods 148. The end and intermediate plates 146A-146C having a matrix of openings 150 therein which define the mini-bundle fuel rod pattern. Elongated hollow tubes 152 (only one being fragmentarily shown in FIG. 12) are mounted through the openings 150 and extend through the shell 144 for defining the slots 16A of the magazine 16 for receiving and holding the fuel rods R in the desired enrichment pattern as determined by the computer-controlled operation of the indexing mechanism 18.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A method for loading fuel rods in a desired pattern, comprising the steps of:
    (a) providing a supply of fuel rods of known enrichments;
    (b) providing a magazine defining a matrix of elongated slots open at their forward ends for receiving fuel rods;
    (c) defining a fuel rod feed path;
    (d) receiving successively one at a time along the feed path fuel rods selected from the supply thereof;
    (e) verifying successively one at a time along the feed path the identity of the selected fuel rods, said verifying including blocking passage of each selected fuel rod along the feed path until the identity of each selected fuel rod is confirmed as correct;
    (f) feeding to the magazine successively one at a time along the feed path the selective and verified fuel rods; and
    (g) supporting and moving the magazine along X-Y axes to successively align one at a time selected ones of the slots with the feed path for loading in the magazine the successive fuel rods in a desired enrichment pattern.

2. The method as recited in claim 1, wherein said verifying includes reading a bar code label on each selected fuel rod.

3. The method as recited in claim 1, wherein providing a supply of fuel rods includes stocking a carrousel with said supply of fuel rods of known enrichments.

4. The method as recited in claim 3, wherein said stocking includes reading and storing the enrichment and location of each fuel rod on the carrousel.

* * * * *